June 12, 1934.                    E. J. SWEETLAND                    1,962,534
                                 LAWN SPRINKLING MEANS
                                  Filed Oct. 7, 1931            2 Sheets-Sheet 1
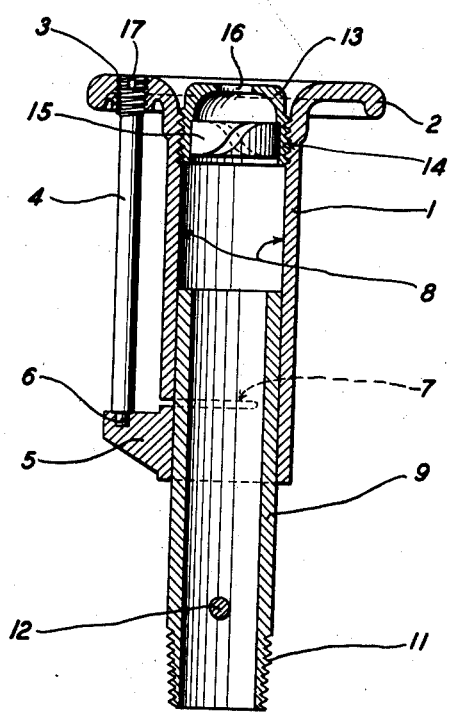
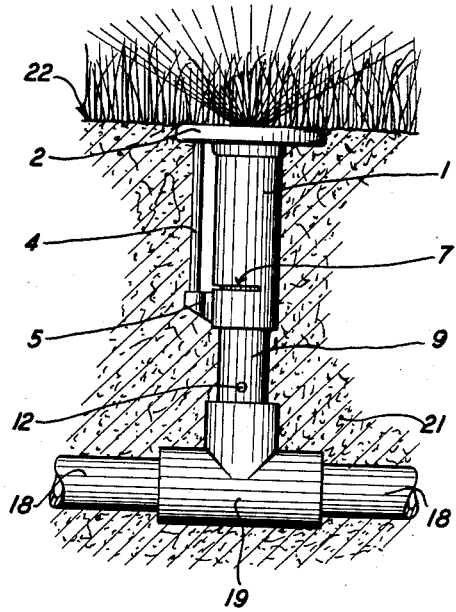
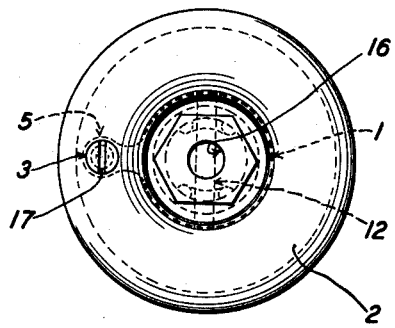
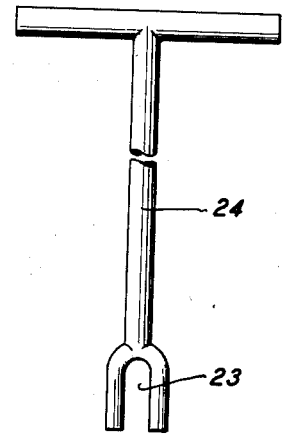
INVENTOR.
Ernest J. Sweetland June 12, 1934.  E. J. SWEETLAND  1,962,534
LAWN SPRINKLING MEANS
Filed Oct. 7, 1931   2 Sheets-Sheet 2
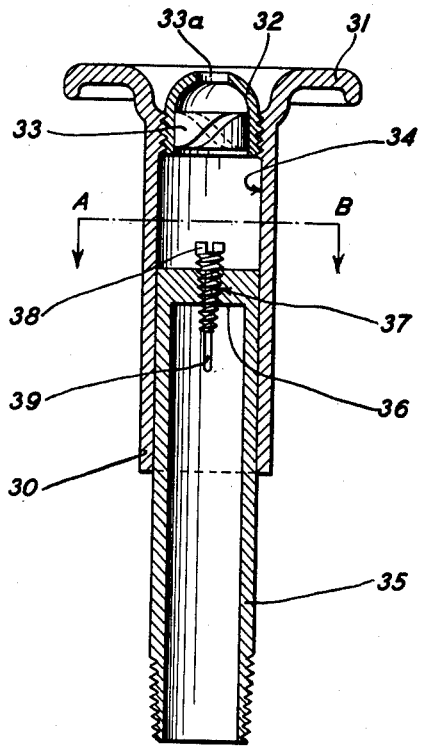
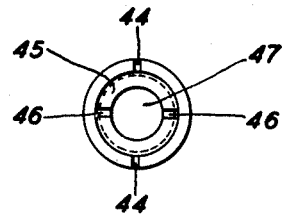
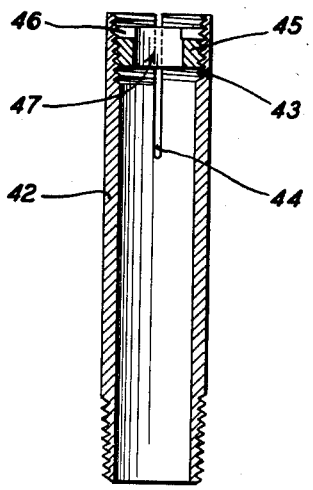
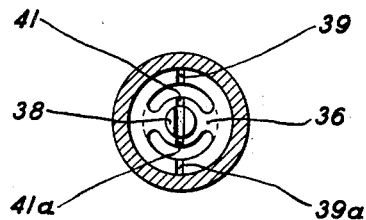
INVENTOR,
Ernest J Sweetland Patented June 12, 1934

1,962,534

UNITED STATES PATENT OFFICE 1,962,534

LAWN SPRINKLING MEANS

Ernest J. Sweetland, Piedmont, Calif.

Application October 7, 1931, Serial No. 567,331

14 Claims. (Cl. 299—60)

This invention relates to means for sprinkling lawns and especially to sprinkler nozzles of the type which are permanently set in the lawn and supplied with water by underground pipes. In systems of the type to which my invention relates it is customary to lay the system of water pipes in parallel rows from 10 to 14 feet apart and 5 or 6 inches underground. Each line of pipe is provided with a T or other suitable fixture at intervals of 10 to 14 feet along the run of the pipe and each of these fittings is equipped with a sprinkler nozzle permanently screwed in place in such manner that the top of the nozzle is flush with the surface of the finished lawn. It is customary to have the nozzles in groups ranging in number from 2 or 3 up to perhaps 100 nozzles in a group. An average group may consist of from 20 to 30 nozzles and the underground piping is so arranged that each group is controlled by a valve which when opened permits the entire group of nozzles to play simultaneously. The arrangement is such that in the finished system there is a complete network of underground piping permanently installed and having sprinkler nozzles over the entire area of the lawn at intervals of 12 or 14 feet or more apart. Such a system eliminates the necessity of bothering with hose and movable sprinklers. A properly installed underground system not only supplies water to the lawn much more uniformly than is possible by hand sprinkling methods but results in great economy in labor as well In theory the permanent sprinkler head placed in the ground is perfectly flush with or slightly below the surface of the lawn, so that the nozzles may be run over by lawn mowers and other garden implements without injury to the sprinklers or to the implements, but unfortunately it is extremely difficult to place these nozzles at exactly the correct elevation. If the nozzles are placed flush with the surface of the ground when the lawn is newly made the ground is almost certain to settle after the lawn has been under irrigation for a period of months. This settling occurs irregularly with the result that the nozzles which were carefully located when the installation was made are found to protrude in varying amounts above the surface of the lawn so that either the lawn mower or the nozzle, or both, may be damaged when the lawn is cut. This necessitates resetting at least a portion of the nozzles to bring them to the proper level after the lawn has settled. Because nozzles heretofore used can be reset only by cutting and threading a new nipple of corrected length upon which to mount the nozzle, this procedure requires skilled labor and considerable expense.

If the installer of the nozzles attempts to anticipate this difficulty by setting the nozzles below the surface of the ground in the newly constructed lawn other problems arise due to the fact that the lawn may settle only a quarter of an inch where one nozzle is located and as much as an inch or more in another location. Furthermore, nozzles set too far below the surface are subject to the objection that the grass grows over the surface of the nozzles and prevents it from delivering a uniform spray.

Attempts have been made to overcome these defects by the use of certain patented sprinkler nozzles of the so-called "pop-up" type. These are located substantially below the surface, and when turned on are caused to rise above the level of the lawn by the water pressure. Nozzles of this type are designed to return to their position below the surface of the lawn after the water is turned off and thus disappear from view and from danger of injury by the lawn mower, but this so-called "pop-up" type of nozzle is subject to the objection that it is much more expensive and complicated than the stationary type and it has been found that in many cases after a period of use they fail to function as intended. These objections are so noticeable that stationary nozzles are still used to a far greater extent than the "pop-up" type. Indeed it is almost as essential to have the "pop-up" type nozzle installed at the correct height as it is with the stationary type and while I have not illustrated my invention with reference to the "pop-up" type of nozzle, it will be obvious to those skilled in the art that the principles employed may be adapted to the "pop-up" type as well as to the stationary type.

So much inconvenience has arisen from all types of lawn sprinkling nozzles due to the ground settling that it has become almost standard practice to set the nozzles, regardless of type, upon so-called "temporary nipples" when the installation is first made. These temporary nipples are usually of such length as to bring the sprinkler nozzles two or three inches above the surface of the lawn. These are generally left in place for a period of from one to three months to give the lawn time to settle, then the temporary nipples are removed and the distance from the underground T to the surface of the lawn is carefully measured and new nipples of exactly the correct length for each individual position are cut and threaded and the nozzles inserted in their permanent position. This involves considerable skilled labor and much inconvenience for it is quite difficult to take out the temporary nipple and install the permanent one without allowing dirt to fall into the pipes and cause obstructions in the nozzles later. Furthermore, it frequently happens that even with these precautions there is further settlement of the lawn or possibly swelling of the ground in places as the sod forms, so that after a year or more some of the nozzles are found either too high or too low, requiring further labor and expense to change the adjustment.

It is the object of my invention to overcome these difficulties by providing a nozzle which is so constructed that it may be permanently installed at once when the lawn is finished and which may be adjusted in height from time to time without removing the sprinkler heads from the ground and without effort other than to loosen a screw that is easily accessible at the surface, moving the nozzle to the required height and then tightening the screw again; all of which can be accomplished without the aid of a mechanic and without tools other than an ordinary screw driver or wrench. The time required for each adjustment is only a few seconds.

Another object is to provide a nozzle that may instantly be removed from the ground and replaced again in the event of stoppage from the inside, or for the replacement of worn parts.

In the present application I have illustrated and described my invention in its simplest form and for purposes of description I have used a conventional form of nozzle which is well known, for in this application I make no claim to the specific design of the nozzle or of the apertures therein but rather to the adjusting means which is applicable regardless of the type of nozzle employed.

Referring to the drawings:

Figure 1 is a sectional elevation of the sprinkler head with its accompanying nozzle and the nipple to which it is attached.

Figure 2 is a plan view of the sprinkler head shown in Figure 1.

Figure 3 is a side elevation of the sprinkler head shown in Figure 2 in position with its connection to an underground water pipe.

Figure 4 is a wrench by means of which the nipple shown in Figure 2 may be removed from the ground without disturbing the surrounding lawn.

Figure 5 is a modification of the invention shown in sectional elevation.

Figure 6 is a horizontal section taken along the lines A—B of Figure 5.

Figure 7 shows a modified form of the lower portion or nipple which may be substituted in place of the nipple structure shown in Figure 5.

Figure 8 is a plan view of Figure 7.

Referring in detail to Figure 1, 1 is the metallic sprinkler head casing provided with the flanged portion 2 which is provided with the threaded opening 3 which receives the adjusting screw 4. Cast integral with the casing 1 is the lug 5 provided with recess 6 which receives the shouldered end of the adjusting screw 4. 7 is a saw cut or slot which is preferably made at right angles to the axis of the casing and extends through about two thirds of the diameter of the casing. The inner surface of the casing 8 is a perfectly smooth surface in which the nippple 9 is a neat sliding fit the outer surface of the nipple also being accurately machined. The lower end of the nipple is provided with thread 11 which screws into any suitable fitting underground. This nipple is provided with the pin 12 which extends clear through the nipple with a close driving fit so that no leakage may occur at the joint. A nozzle casing 13 is screwed into the threaded portion of the sprinkler head casing at the point 14 and since the upper portion of the nozzle is hexagonal in shape it may be readily unscrewed for cleaning or replacement. Inside of the nozzle casing 13 is a spiral core 15 which gives the water under pressure a rapid swirling motion causing it to discharge through the aperture 16 in the form of a fine spray. It should be understood that any type of nozzle may be employed in place of the nozzle represented in the drawings by the parts 13, 15 and 16 to which no claim of invention is herein made.

The reduced lower end of the screw 4 is a loose fit in the recess 6 of lug 4 so that it is free to turn and force the lug downward when a screw driver is applied in the screw driver slot 17 at its upper extremity.

The details of Figure 2 which is a plan view of Figure 1 will be understood from the foregoing description as the reference numerals in Figure 2 designate the parts indicated by corresponding numerals in Figure 1.

Referring to Figure 3, 18 is an underground water pipe which is a portion of a system fed by a control valve and to which a plurality of sprinkler heads are attached. 19 is an ordinary pipe T which receives the nipple 9 which corresponds to the nipple bearing the same numeral in Figure 1. The drawing shows the sprinkler head casing 1 and flange 2 when normally installed in the lawn, 21 representing the soil and 22 the grass on the surface of the lawn.

Figure 4 illustrates a key or wrench which is of such size as to enter the inside of the nozzle 9 and receive the pin 12 in the slotted opening 23 it being a great convenience to be able to remove the nipple 9 from the ground without the necessity of removing the soil in order to make room for a pipe wrench in the event that removal or replacement should become necessary.

In the structure shown in Figure 5 the clamping mechanism is built in connection with the inner telescopic member or nipple instead of operating through the outer member or casing as shown in the previous figures.

In Figure 5, 30 is the sprinkler head casing having an outwardly extending flange 31 with an internal thread to receive the sprinkler nozzle element 32 which is provided with the spiral core 33 and aperture 33a through which the spray of water is discharged. The interior of the casing 34 is machined to a smooth surface which receives the nipple 35, the outer surface of which is also made smooth to provide a neat sliding fit within the casing. The upper portion of the nipple is provided with a cross member 36 in which is formed the tapered thread 37 which receives the tapered screw 38. The vertical slot 39 is cut down on the two sides of the nipple to permit the upper portion of the nipple to expand when the screw 38 is advanced in the tapered thread. The spring in the metal of which the nipple is formed is sufficient to cause the upper portion to contract to its normal circular form when the screw 38 is retracted. The details of this arrangement will be clarified by reference to Figure 6 in which the cross bar 36, screw 38 and the slots 39 and 39a of the nipple are clearly shown. In this figure it will be noted that the bar 36 is completely bisected by the slits 41 and 41a so that when the screw 38 is advanced there is nothing to interfere with the threaded walls of the bar 36 pushing outward which tends to open the slots 39, 39a, 41 and 41a causing the upper end of the nipple to expand and be tightly clamped inside of the casing.

The construction of nipple shown in Figure 7 may be used in exactly the same casing as is shown in Figure 5 so that in this figure the casing has been omitted. In this figure 42 is the nipple of brass or other suitable metal and this is provided with tapered thread 43 and two or more saw cuts or slots 44 into which is fitted the threaded tapered plug 45 and the top of the plug is slotted to receive a screw driver at the point 46. This nipple functions in the same manner as the nipple shown in Figure 5 in that when the tapered threaded plug 45 is advanced in the nipple the slots 44 are opened out causing the top of the nipple to expand and clamp itself firmly in any required position inside of the casing 30. It will be noted that a liberal passageway 47 is provided through the tapered plug to permit a free flow of water through the nipple and out through the sprinkler nozzle.

Figure 8 which is a plan view of Figure 7 shows the location of the slits 44, the screw driver slot 46, and the aperture 47 in the plug 45.

The installation and operation of the nozzles is as follows: The underground pipe having been laid as usual, the nipples which form the lower member of the sprinkler heads are screwed tightly in place in the underground T 19. The sprinkler head casing is then slipped over the nipple and adjusted to the level of the lawn and tightly clamped in place by screwing down the adjusting screw 4 if the design shown in Figure 1 is used, or by screwing down the tapered screw 38 or the tapered plug 45, as the case may be, if the design shown in Figure 5 or Figure 7 is employed. When using the design shown in Figures 5 and 7 it is obviously necessary to remove the nozzle 32 while the adjustment is being made. This having been accomplished the installation is complete and is immediately placed into service to be used regularly until such time as the sinking or swelling of the lawn has caused the lawn level to change with respect to the height of the sprinkler head. When this occurs the head illustrated in Figure 1 may be adjusted by inserting a screw driver in slot 17 and loosening the adjusting screw 4 which releases the clamping effect so that the head may be raised or lowered to the desired adjustment when the screw 4 is again tightened and the operation is complete. The adjustment in the case of Figure 5 or Figure 7 is obviously effected in a similar manner by removing the nozzle 32 and releasing the screw 38 or the screw plug 45 as the case may be.

It will be noted that all of the parts are readily accessible for removal in case replacement is needed and that even the nipple as illustrated in Figure 1 may be removed from the ground without disturbing the surrounding earth, if necessary. In the event of stoppage due to foreign matter in the water the nozzle 13 or 32 may be removed with a socket wrench or the entire upper portion of the sprinkler head may be lifted off and replaced.

In practice the nipples 9, 35 or 42 would be furnished in standard lengths in even steps of one inch, the fractional variations being taken care of by the adjustment feature of the nozzle. This entirely eliminates cutting and threading nipples in the field and thus eliminates the necessity of special tools and skilled labor.

Throughout the following claims where the term "adjustable" is used it is intended to mean adjustable with relation to the surface of the surrounding lawn or ground, and has no reference to adjustment of the flow of water. The term "underground" is intended to indicate that the body of the sprinkler head is underground although the upper surface of the head or nozzle is exposed—this to distinguish from sprinkling devices of the portable type that are moved from place to place to irrigate different areas. The term "embedded" is intended to designate nozzles or sprinkler heads that are permanently embedded in the ground and attached to underground pipes as distinguished from portable nozzles or sprinklers that are used usually in connection with a hose on the surface of the lawn.

I do not limit myself to the specific forms herein illustrated and described as my invention is subject to many modifications.

I claim:

1. Lawn sprinkling means comprising an underground pipe, an upright nipple secured to said pipe and a sprinkler head adjustably secured to said nipple and having its upper surface substantially even with the surface of the lawn, clamping means to secure said nipple to said sprinkler head operable through a screw extending to the upper surface of said sprinkler head.

2. A lawn sprinkling mechanism of the embedded type comprising a nozzle-bearing casing slidably mounted and forming a substantially water tight union with a tubular water supplying conduit, a substantially vertical slot and an internal thread in the upper extremity of said conduit, a threaded tapered plug fitted into said thread whereby the said tubular conduit may be adjustably locked in the interior of said casing member.

3. A lawn sprinkling mechanism of the embedded type comprising a casing and a removably secured sprinkler nozzle, said casing being slidably mounted upon a nipple having a screw threaded expansible upper extremity, a screw threaded tapered perforate plug fitted within the upper extremity of said nipple whereby said nipple may be expanded to form a substantially water tight joint between the casing and the nipple.

4. A lawn sprinkling device comprising a pair of hollow telescopic members one of which is adapted to be permanently secured to an underground pipe and the other being provided with a removable sprinkler nozzle, means for causing one of said members to expand within the other member to form a substantially water tight joint.

5. The combination with a lawn sprinkler of the imbedded type of a sprinkler head casing having a removable nozzle, a nipple telescopically fitted to said casing, screw means for expanding said nipple within said casing, said screw means being accessible for adjustment from the lawn surface upon removal of said nozzle from said casing.

6. Lawn sprinkling means of the imbedded type comprising a sprinkler head casing with a removable nozzle, an outwardly extending flange surrounding said nozzle, a revolvable shaft having its upper end accessible through an opening in said flange and its lower end operatively connected to locking means for securing said casing to an underground conduit to supply water to said sprinkler nozzle.

7. A lawn sprinkler of the imbedded type comprising a flanged sprinkler head casing with a removable nozzle, frictional means for securing said casing to an upright underground supply conduit comprising a screw in axial alignment with said casing and said conduit, said screw being below the ground level in the normally installed sprinkler and accessible from above the ground level by removal of said nozzle.

8. A lawn sprinkling device of the imbedded type comprising a sprinkler nozzle fitted to a hollow casing, said casing being slidably mounted upon a stationary underground water-supply nipple, means of securing said casing in adjusted position upon said nipple comprising a tapered screw carried by a thread in the upper extremity of said nipple, a slot in said nipple to permit expansion thereof when said screw is advanced into said thread.

9. A lawn sprinkling device comprising the combination of a sprinkler head casing provided with a removable nozzle with a nipple upon which said casing is slidably mounted, an internal thread in the upper end of said nipple, a slot intersecting said thread to permit expansion of the threaded portion of said nipple, a tapered screw fitted to said thread and having a tool receiving surface which is rendered accessible by the removal of said nozzle from said casing.

10. Lawn sprinkling means comprising an underground pipe, an upright nipple secured to said pipe and a sprinkler head removably secured to said nipple and having its upper surface substantially even with the surface of the lawn, clamping means to secure said nipple to said sprinkler head operable through a screw extending upwardly and accessible from above the lawn surface.

11. Lawn sprinkling means comprising a nozzle-bearing casing and a nipple telescopically fitted within said casing, screw means for expanding said nipple within said casing, said screw means being located within said casing and operable from the lawn surface.

12. Sprinkling means comprising a casing telescopically fitted to a nipple and having a removable sprinkler nozzle, screw means for expanding a portion of said nipple within said casing, said screw means being normally enclosed within said casing and accessible through said casing when said sprinkler nozzle is removed.

13. Lawn sprinkling means of the imbedded type comprising a sprinkler head casing, a shaft supported by said casing at its upper end and having its lower end operatively connected to locking means for adjustably securing said casing to an underground conduit.

14. Sprinkling means comprising a pair of telescopically fitted hollow conduits, a nozzle removably secured to the outer one of said conduits, means carried by the inner one of said conduits for expanding a portion of the wall thereof against the wall of the outer conduit, said means being accessible through the outer conduit upon removal of said nozzle therefrom.

ERNEST J. SWEETLAND.